(12) United States Patent
Liao

(10) Patent No.: US 9,671,827 B2
(45) Date of Patent: Jun. 6, 2017

(54) VEHICLE, DRIVING ASSISTANCE SYSTEM AND DRIVING ASSISTANCE DEVICE

(71) Applicant: HON HAI PRECISION INDUSTRY CO., LTD., New Taipei (TW)

(72) Inventor: Kuang-Yao Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 299 days.

(21) Appl. No.: 14/291,266

(22) Filed: May 30, 2014

(65) Prior Publication Data

US 2014/0354881 A1 Dec. 4, 2014

(30) Foreign Application Priority Data

Jun. 3, 2013 (TW) .............................. 102119608 A

(51) Int. Cl.
*G01C 21/26* (2006.01)
*G06F 1/16* (2006.01)
*G06F 3/041* (2006.01)

(52) U.S. Cl.
CPC ......... *G06F 1/1632* (2013.01); *G01C 21/265* (2013.01); *G06F 3/0412* (2013.01)

(58) Field of Classification Search
CPC ... G06F 1/1632; G06F 3/0412; H04N 5/2252; H04N 5/232; B60K 2350/1024; B60K 2350/1028; B60K 35/00; B60K 37/06; B60R 11/02; B60R 11/0235; B60R 1/12; B60R 2001/1284; B60R 2011/0026; B60R 2011/0075; G01C 21/3664; G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268

(Continued)

(56) References Cited

U.S. PATENT DOCUMENTS 5,940,503 A * 8/1999 Palett ................... B60R 1/12
379/446
8,082,009 B2 * 12/2011 Baratono .................. B60R 1/12
455/569.1

(Continued)

FOREIGN PATENT DOCUMENTS

CN 102749967 A 10/2012
CN 102756695 A 10/2012

(Continued)

*Primary Examiner* — Nathnael Aynalem
(74) *Attorney, Agent, or Firm* — Steven Reiss

(57) ABSTRACT

A driving assistance device includes a housing, a controller, a plug connector, and a power line. The controller is received in the housing and includes a microprocessor, a supply line, a signal line, and a storage module. The storage module is electrically coupled to the microprocessor. The plug connector is assembled within the housing, and electrically coupled to the microprocessor via the supply line and the signal line. The power line is electrically coupled to the supply line. The present disclosure further discloses a driving assistance system and a vehicle employing the driving assistance device.

9 Claims, 5 Drawing Sheets

(58) Field of Classification Search
USPC ....... 348/49, 148, 376; 361/679.41; 345/173
See application file for complete search history.

(56) References Cited

U.S. PATENT DOCUMENTS

| | | | | |
|---|---|---|---|---|
| 2002/0003571 | A1* | 1/2002 | Schofield | B60C 23/00 348/148 |
| 2002/0154007 | A1* | 10/2002 | Yang | B60Q 1/22 340/456 |
| 2003/0193613 | A1* | 10/2003 | Matko | B60R 1/00 348/375 |
| 2008/0077882 | A1* | 3/2008 | Kramer | B60K 35/00 715/810 |
| 2010/0097469 | A1* | 4/2010 | Blank | B60R 1/12 348/148 |
| 2012/0182242 | A1* | 7/2012 | Lindahl | B60R 1/12 345/173 |
| 2013/0220847 | A1* | 8/2013 | Fisher | B65D 25/005 206/216 |

FOREIGN PATENT DOCUMENTS

| | | |
|---|---|---|
| CN | 202815955 U | 3/2013 |
| TW | M452094 U1 | 5/2013 |

\* cited by examiner

VEHICLE, DRIVING ASSISTANCE SYSTEM AND DRIVING ASSISTANCE DEVICE

FIELD

The present disclosure generally relates an driving assistance device, and more particularly, to a portable driving assistance device, a driving assistance system and a vehicle adopting the portable driving assistance device.

BACKGROUND

Vehicles have become part of our lives, and can be equipped with a plurality of assistance devices, such as driving monitors and portable navigation devices.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The term "coupled" is defined as coupled, whether directly or indirectly through intervening components, and is not necessarily limited to physical connections. The connection can be such that the objects are permanently coupled or releasably coupled.

Figure 1:
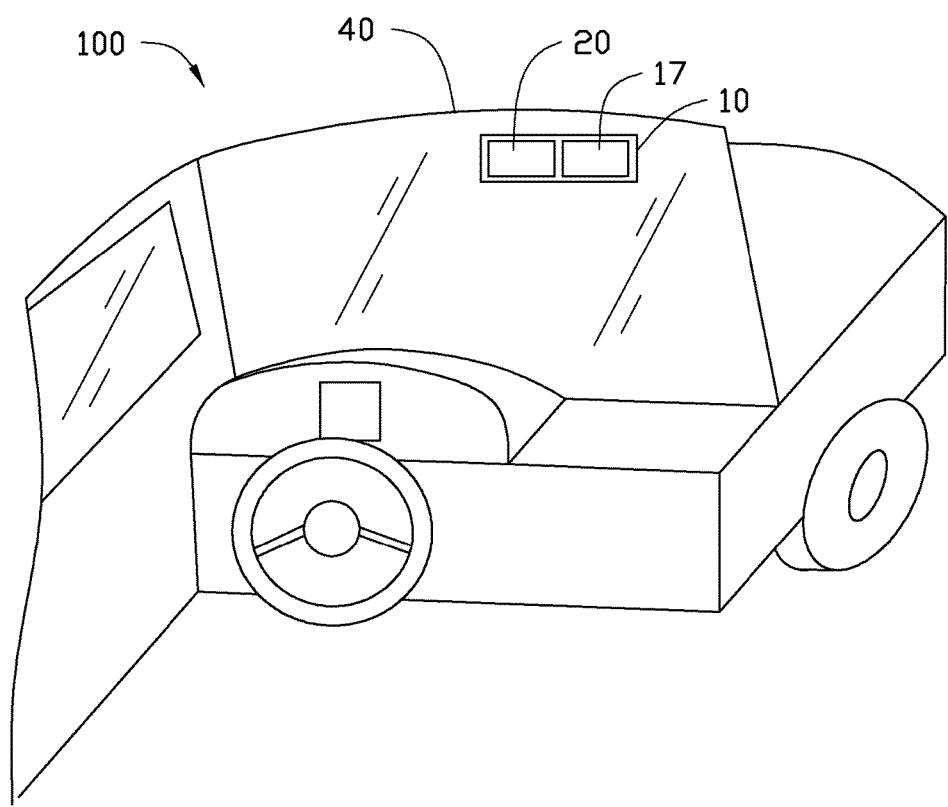
FIG. 1 shows a partial, isometric view of an embodiment of a vehicle, the vehicle includes a driving assistance system employing a driving assistance device.
Figure 2:
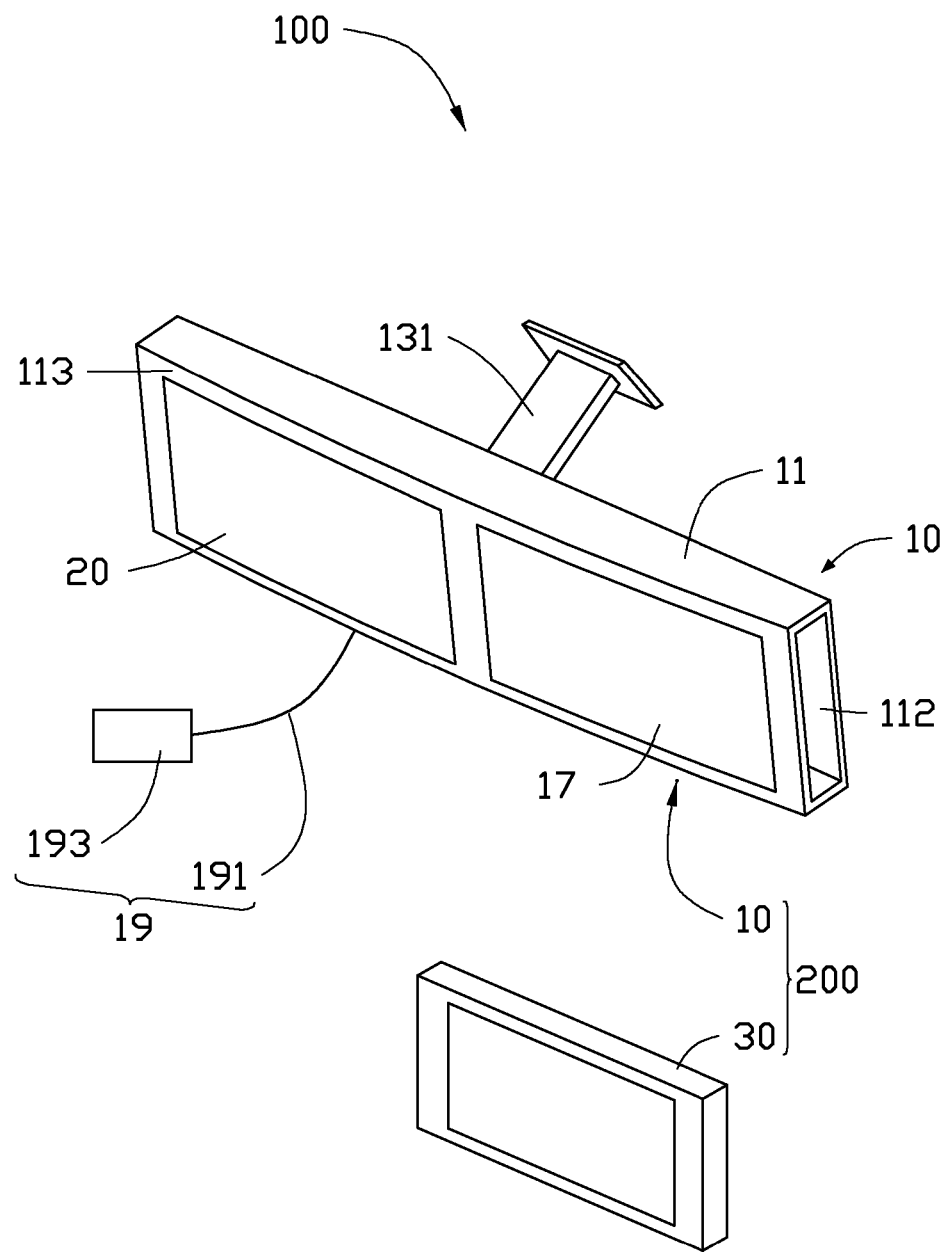
FIG. 2 is an exploded, isometric view of the driving assistance system of FIG. 1.

FIGS. 1 and 2 illustrate a vehicle 100 of the disclosure. The vehicle 100 includes a driving assistance device 10, a rear view mirror 20, and a front windshield 40. The driving assistance device 10 is coupled to the front windshield 40 and faces the driver in the interior of the vehicle 100. The rear view mirror 20 is assembled to the driving assistance device 10. The driving assistance device 10 is electrically coupled to a portable smart device 30. A driving assistance system 200 includes the driving assistance device 10 and the portable smart device 30 can function as a driving monitor and driving navigation device, simultaneously. In the embodiment, the portable smart device 30 is a smart-phone. The vehicle 100 also includes a steering wheel, a chassis, and other structures that are unrelated to the disclosure but necessary for the operation of the vehicle, the description of such structures are omitted for simplicity.

Figure 3:
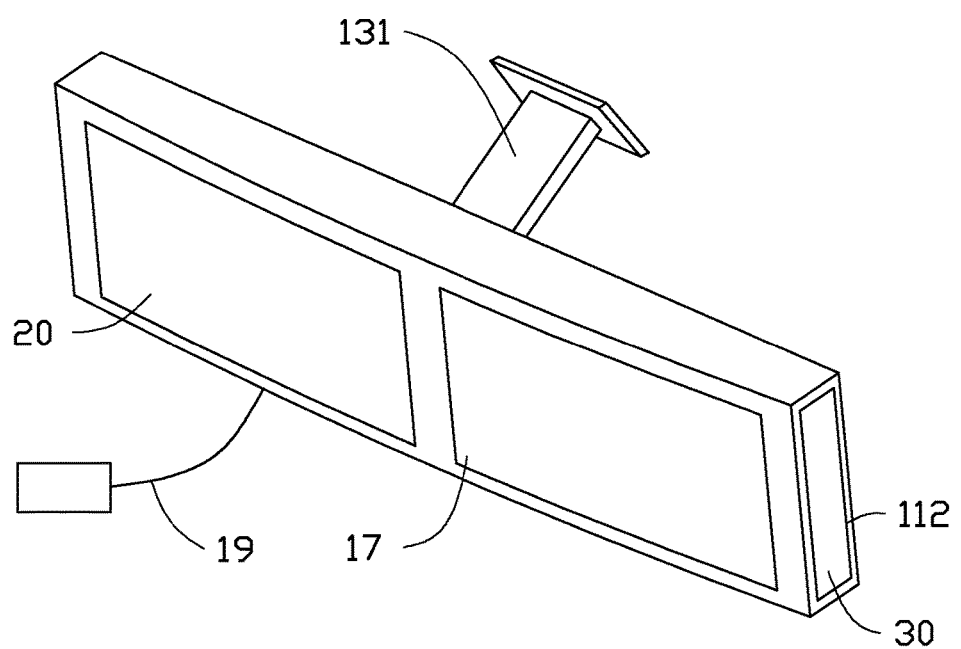
FIG. 3 is an assembled, isometric view of the driving assistance device of FIG. 1.
Figure 4:
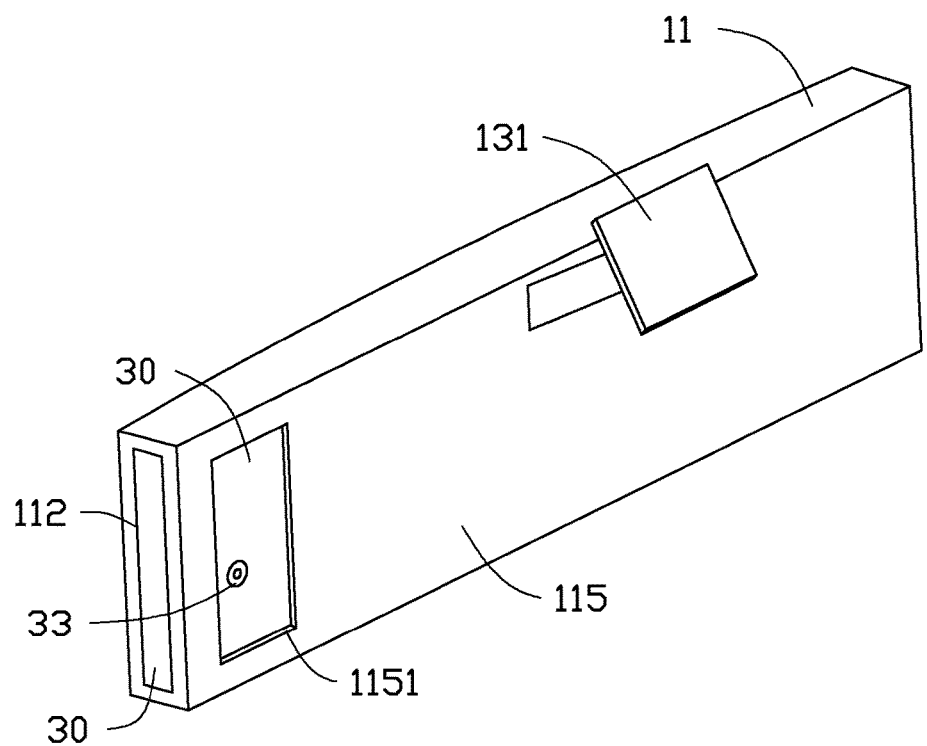
FIG. 4 is similar to FIG. 3, but viewed from another aspect.

FIGS. 2 through 4 illustrate the driving assistance device 10 including a housing 11, a plug connector 12 (see FIG. 5), a supporting member 131, a touch screen 17, a controller 18 (see FIG. 5), and a power line 19. The housing 11 is substantially a cube shape, and defines a receiving chamber 112 at an end of the housing 11 for receiving the portable smart device 30. The housing 11 further defines a first surface 113 and a second surface 115 at opposite sides, and defines an opening 1151 on the second surface 115. The second surface 115 faces the front windshield 40 and is located adjacent to the front windshield 40. The opening 1151 is coupled to the receiving chamber 112. The plug connector 12 is assembled to the housing 11 and is received in the receiving chamber 112, and configured for electrically coupling to the portable smart device 30. The supporting member 131 is secured to the second surface 115 of the housing 11. An end of the supporting member 131 away from the housing 11 is coupled to the front windshield 40 of the vehicle 100 for supporting the housing 11. In an embodiment, the supporting member 131 can be a suction cup. The touch screen 17 is assembled to the first surface 113, and opposite to the opening 1151. The rear view mirror 20 is assembled to the first surface 113 and adjacent to the touch screen 17. The touch screen 17 and the rear view mirror 20 are co-planar.

Figure 5:
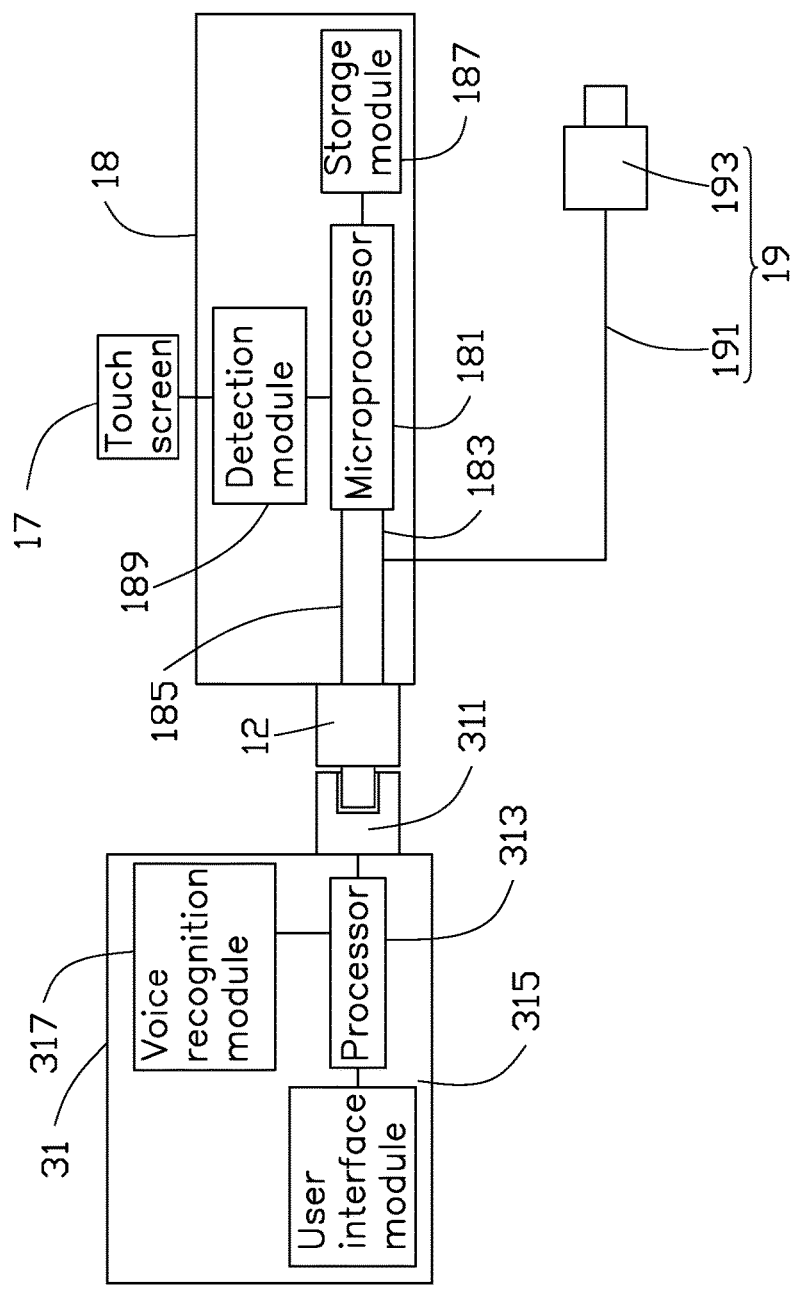
FIG. 5 is a diagram of function blocks of the driving assistance of FIG. 1.

FIG. 5 illustrates that the controller 18 is received in the housing 11, and is electrically coupled to the plug connector 12 and the touch screen 17. The controller 18 includes a microprocessor 181, a supply line 183, a signal line 185, a storage module 187, and a detection module 189. The microprocessor 181 is electrically coupled to the plug connector 12 via the supply line 183 and the signal line 185, therefore, the microprocessor 181 can exchange data with the portable smart device 30 via the signal line 185. The storage module 187 is electrically coupled to the microprocessor 181 and is configured for saving data received from the portable smart device 30. The detection module 189 is electrically coupled to the microprocessor 181 and the touch screen 17 for detecting whether a touch command is generated on the touch screen 17. When the detection module 189 detects that a touch command is generated, the detection module 189 transfers the touch command to the microprocessor 181, and the microprocessor 181 transfers the touch command to the portable smart device 30 via the plug connector 12, thereby controlling the portable smart device 30 to respond accordingly.

The power line 19 is electrically coupled to the supply line 183 for supplying electrical power to the microprocessor 181 and the portable smart device 30. The power line 19 comprises a conducting line 191 and a supply plug 193 electrically coupled to the conducting line 191. The conducting line 191 is electrically coupled to the supply line 183. The supply plug 193 can be inserted into a cigarette lighter of the vehicle 100 to couple with the electrical power.

The portable smart device 30 is received in the receiving chamber 112 and aligned with the touch screen 17. The portable smart device 30 is releasably and electrically coupled to the plug connector 12. The portable smart device 30 includes a main body 31, a plug interface 311 (see FIG. 5), and a camera 33 (see FIG. 4). In the embodiment, the plug interface 311 and the camera 33 are assembled to the main body 31, the plug interface 311 is a standard video input interface of the portable smart device 30, and the camera 33 is a rear camera lens. The main body 31 is received in the receiving chamber 122 and aligned to the touch screen 17 to enable the camera 33 to be aligned to the opening 1151. The main body 31 includes a processor 313, a user interface (UI) module 315, and a voice recognition module 317. The plug interface 311, the user interface module 315 and the voice recognition module 317 are electrically coupled to the processor 313. When the plug connector 12 is inserted into the plug interface 311, the processor 313 makes a connection request to the microprocessor 181, the microprocessor 181 accepts the request to establish a connection between the processor 313 and the microprocessor 181. Simultaneously, the microprocessor 181 makes a request for an audio signal to the portable smart device 30. Then the processor 313 accepts the request and transfers the audio signal to the microprocessor 181. The microprocessor 181 receives and transfers the audio signal to the touch screen 17 to enable the touch screen 17 to display an image of the audio signal. Driving assistance software downloaded from internet is installed in the portable smart device 30, and the processor 313 is capable of controlling the driving assistance software.

In the embodiment, the driving assistance software includes (but not necessary limited to) driving recording software, and navigation software, for example. The driving assistance software is capable of recording images in front of the vehicle 100 via the camera 33, and record sounds within the vehicle 100 via the recording components of the portable smart device 30. The processor 313 transfers the recordings of the images and the audio to the microprocessor 181. The microprocessor 181 transfers above-mentioned recordings to the storage module 187 to be saved. The navigation software obtains navigation signals such as current geographic coordinates of the vehicle 100 and navigation image data of environment via global positioning system (GPS). The processor 313 transfers the navigation signals to the microprocessor 181 to enable the touch screen 17 to display the navigation signals. When the voice recognition module 317 identifies a voice command from a user, it sends the command to the processor 313, the processor 313 starts corresponding assistance software to execute actions according to the voice command and controls the user interface module 315 to display an image of the assistance software.

The plug connector 12 is inserted into the plug interface 311, therefore the portable smart device 30 transfers signals to the microprocessor 181 via the signal line 185, and obtains electricity from the power line 19 via the supply line 183. When user touches the touch screen 17, the detection module 189 detects a touch command generated by the touch screen 17, transfers the touch command to the microprocessor 181, and finally transfers the command to the processor 313 of the portable smart device 30 via the plug connector 12. The processor 313 controls user interface module 315 to display corresponding driving assistance software. Simultaneously, the processor 313 sends signal to the microprocessor 181, then the microprocessor 181 controls the touch screen 17 to display images the same as displayed on the portable smart device 30. The camera 33 is positioned on the opening 1151 to record images in front of the vehicle 100.

When in use, the supply plug 193 is inserted into the cigarette lighter of the vehicle 100 to get electricity, and transfers the electricity to the microprocessor 181 and the plug connector 12. The portable smart device 30 is received in the receiving chamber 112, and the plug connector 12 is inserted into the plug interface 311, then the supply line 183 charges the portable smart device 30. The processor 313 makes a connecting request to the microprocessor 181, the microprocessor 181 accepts the request to establish a connection between the microprocessor 181 and the processor 313, and simultaneously the microprocessor 181 makes a request to send the audio signal to the processor 313. The processor 311 accepts the request and transfers the audio signal to the microprocessor 181. The microprocessor 181 receives and transfers the audio signal to the touch screen 17 to enable the touch screen 17 to display the image shown on the portable smart device 30.

When the voice recognition module 317 identifies a voice command from the user, it sends the command to the processor 313, the processor 313 controls the user interface module 315 to display the image of the corresponding driving assistance software and start the driving assistance software to execute actions according the voice command. The driving assistance software is capable of recording an image in the front of the vehicle 100 via the camera 33, and record sound within the vehicle 100 via the recording components of the portable smart device 30. The processor 313 transfers the recordings of the images and the sound to the microprocessor 181. The microprocessor 181 transfers the above-mentioned recordings to the storage module 187 to be saved.

When user touches the touch screen 17, the detection module 189 detects a touch command generated by the touch screen 17, and transfers the touch command to the microprocessor 181, and finally transfers to the processor 313 of the portable smart device 30 via the plug connector 12. The processor 313 controls the user interface module 315 to display the image of and start the corresponding driving assistance software. Simultaneously, the processor 313 sends the signal to the microprocessor 181, then the microprocessor 181 controls the touch screen 17 to display images shown on the user interface module 315. The camera 33 is positioned on the opening 1151 to record the images of the vehicle 100.

The detection module 189 may be omitted. When user touches the portable smart device 30 directly to accomplish the recording of sound and images, and obtains the navigation information, the voice recognition module 317 and the touch screen 17 may be omitted. When a rearview mirror is assembled to the front windshield 40, the supporting member 12 may be mounted on a shelving unit of the vehicle 100.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. A driving assistance device detachably coupled to a portable smart device, wherein the portable smart device executes recordings of images in front of a vehicle and recordings of sounds within the vehicle, the driving assistance device comprising:
    a housing;
    a controller received in the housing, the controller comprising: a microprocessor, a supply line, a signal line, and a storage module electrically coupled to the microprocessor;
    a plug connector electrically coupled to the microprocessor by the supply line and the signal line, wherein the plug connector is configured to be detached from the portable smart device, and electrically coupled to the portable smart device, whereby the plug connector charges the portable smart device; and
    a power line electrically coupled to the supply line, wherein the microprocessor is configured to:
        exchange signal data and the recordings with the portable smart device by the signal line and the plug connector,
        transfer the signal data and the recordings to the storage module to be saved; and
        receive electrical power from the power line;
    wherein the housing contains a receiving chamber at an end of the housing, a first surface and a second surface at opposite sides of the first surface facing a windshield of the vehicle, the housing further contains an opening at the second surface, the opening is coupled to the receiving chamber, the receiving chamber is configured for receiving the portable smart device, the opening is configured for exposing part of the portable smart device, the plug connector is disposed in the receiving chamber, wherein a touch screen is assembled to the first surface for displaying images the same as the portable smart device, and a camera of the portable smart device is aligned with the opening on the second surface facing the windshield of the vehicle for recording the images in front of the vehicle.

2. The driving assistance device of claim 1, wherein the controller further comprises a detection module electrically coupled to the microprocessor, the touch screen electrically is coupled to the detection module, the touch screen is configured to generate a touch command, the detection module detects the touch command and transfers the touch command to the microprocessor, causing the microprocessor to control the portable smart device.

3. A driving assistance system, comprising:
a portable smart device, wherein the portable smart device executes recordings of images in front of a vehicle and recordings of sounds within the vehicle; and
a driving assistance device detachably coupled to the portable smart device, the driving assistance device comprising:
a housing;
a controller received within the housing, the controller comprising:
a microprocessor;
a supply line;
a signal line; and
a storage module electrically coupled to the microprocessor;
a plug connector assembled within the housing, and electrically coupled to the microprocessor by the supply line and the signal line; and
a power line electrically coupled to the supply line;
wherein the plug connector is configured to be detached from the portable smart device, and electrically coupled to the portable smart device, the microprocessor exchanges signal data and the recordings with the portable smart device by the signal line and the plug connector, and transfers the signal data and the recordings to the storage module to be saved, the microprocessor is capable of getting electrical power from the power line, and the plug connector charges the portable smart device;
wherein the housing contains a receiving chamber at an end of the housing, a first surface and a second surface at opposite sides of the first surface facing a windshield of the vehicle, the housing further contains an opening at the second surface, the opening is coupled to the receiving chamber, the receiving chamber is configured for receiving the portable smart device, the opening is configured for exposing part of the portable smart device, the plug connector is disposed in the receiving chamber, wherein a touch screen is assembled to the first surface for displaying images the same as the portable smart device, and a camera of the portable smart device is aligned with the opening on the second surface facing the windshield of the vehicle for recording the images in front of the vehicle.

4. The driving assistance device of claim 3, wherein the controller further comprises a detection module electrically coupled to the microprocessor, the touch screen is electrically coupled to the detection module, the touch screen is configured to generate a touch command, the detection module detects the touch command and transfers the touch command to the microprocessor, causing the microprocessor to control the portable smart device.

5. The driving assistance system of claim 3, wherein the driving assistance device further comprises a supporting member secured to the second surface of the housing, an end of the supporting member away from the housing is secured to the vehicle.

6. The driving assistance system of claim 3, wherein the portable smart device comprises a main body, a plug interface, and a camera lens, the plug interface and the camera lens are assembled to the main body, the main body and the plug interface are received in the receiving chamber, the camera lens is aligned to the opening of the second surface.

7. The driving assistance system of claim 6, wherein the main body comprises a processor, a user interface module, and a voice recognition module, the plug interface, the user interface module and the voice recognition module are electrically coupled to the processor, the touch screen is electrically coupled to the microprocessor, when the plug connector is electrically coupled to the plug interface, the processor is capable of transferring audio signal to the microprocessor, the microprocessor transfers the audio signal to the touch screen to enable the touch screen to display an image of the audio signal thereon.

8. The driving assistance system of claim 7, wherein driving assistance software downloaded from internet is installed in the portable smart device, when a touch command is generated by the touch screen, the microprocessor transfers the touch command to the processor of the portable smart device by the plug connector, the processor controls the user interface module to display an image of corresponding driving assistance software and start the driving assistance software to execute action according to the touch command, simultaneously, the processor sends a signal to the microprocessor, causing the microprocessor to control the touch screen to display images the same as the portable smart device displayed.

9. The driving assistance system of claim 7, wherein when the voice recognition module identifies a voice command from user, the voice recognition module sends the voice command to the processor, the processor controls the user interface module to display an image of corresponding driving assistance software and start the driving assistance software to execute actions according the voice command, the driving assistance software is capable of recording the image in front of the vehicle by the camera lens, and recording the sound within the vehicle by recording components of the portable smart device.

* * * * *